United States Patent
Re'em

(10) Patent No.: US 7,897,652 B2
(45) Date of Patent: Mar. 1, 2011

(54) POLYURETHANE COMPOSITION USEFUL AS SHOCK ABSORBERS AND A METHOD FOR THEIR PREPARATION

(75) Inventor: Nehemya Re'em, Mercaz Shapira (IL)

(73) Assignee: Orycle Applications Ltd., Kiryat Gat (IL)

( * ) Notice: Subject to any disclaimer, the term of this patent is extended or adjusted under 35 U.S.C. 154(b) by 0 days.

(21) Appl. No.: 10/450,810

(22) PCT Filed: Dec. 19, 2001

(86) PCT No.: PCT/IL01/01184

§ 371 (c)(1), (2), (4) Date: Nov. 18, 2003

(87) PCT Pub. No.: WO02/50148

PCT Pub. Date: Jun. 27, 2002

(65) Prior Publication Data

US 2004/0097608 A1 May 20, 2004

(30) Foreign Application Priority Data

Dec. 20, 2000 (IL) .......................................... 140429

(51) Int. Cl.
*C08J 9/08* (2006.01)
(52) U.S. Cl. ......... 521/132; 521/127; 521/129; 521/130; 521/131; 521/174
(58) Field of Classification Search .................. 521/130, 521/131, 132, 174, 127, 129
See application file for complete search history.

(56) References Cited

U.S. PATENT DOCUMENTS

| | | | |
|---|---|---|---|
| 3,926,866 A | 12/1975 | Komatsu et al. | |
| 4,110,268 A * | 8/1978 | Longley et al. | 521/177 |
| 4,243,755 A | 1/1981 | Marx et al. | |
| 4,554,295 A | 11/1985 | Ridge | |
| 4,561,922 A * | 12/1985 | Peerman et al. | 156/331.4 |
| 4,722,946 A * | 2/1988 | Hostettler | 521/158 |
| 4,734,439 A | 3/1988 | Reischl | |
| 4,987,156 A | 1/1991 | Tozune et al. | |
| 5,047,494 A | 9/1991 | Lin | |
| 5,128,381 A | 7/1992 | Tane et al. | |
| 5,614,575 A | 3/1997 | Kotschwar | |
| 5,621,043 A * | 4/1997 | Croft | 525/111 |
| 5,677,048 A | 10/1997 | Pushaw | |
| 5,688,860 A * | 11/1997 | Croft | 524/710 |
| 5,786,402 A * | 7/1998 | Bruchmann et al. | 521/129 |
| 5,849,806 A * | 12/1998 | St. Clair et al. | 521/109.1 |
| 5,922,779 A * | 7/1999 | Hickey | 521/114 |
| 6,169,124 B1 * | 1/2001 | Horn et al. | 521/155 |
| 6,331,577 B1 * | 12/2001 | Volkert et al. | 521/159 |

FOREIGN PATENT DOCUMENTS

| | | |
|---|---|---|
| JP | 59015433 A2 | 1/1984 |
| JP | 61152740 A2 | 7/1986 |

OTHER PUBLICATIONS

Database WPI, Week 8720; Derwent Publication Ltd. London, GB; AN 1987-139972, XP002203770; "Impact Absorbent Polyurethane Foams" & JP 62 079217 A, Apr. 11, 1987.
Database WPI, Week 9330; Derwent Publication Ltd. London, GB; AN 1993-241662, XP002203771; "Hydroxyl Component for Production of Polyurethane Foams" & SU 1 752 741 A, Aug. 7, 1992.
Database WPI, Week 9416; Derwent Publication Ltd. London, GB; AN 1994-132817, XP002203772; "Preparation of Polyurethane Foams From Polyol and Isocyanate" & ES 2 070 029 A, May 16, 1995.
*Szycher's Handbook of Polyurethanes*, by Michael Szycher; pp. 8-16 and 8-17; c. 1999.

* cited by examiner

*Primary Examiner* — John Cooney
(74) *Attorney, Agent, or Firm* — Mark M. Friedman

(57) ABSTRACT

A polyurethane foam composition comprising at least: at least one polyether polyol having an average molecular weight from 100-20,000; an aromatic polyisocyanate; a tackifying resin; a surfactant; a blowing agent, and a catalyst. A method for preparation of a polyurethane foam composition useful in shock absorption, is also disclosed.

14 Claims, No Drawings

POLYURETHANE COMPOSITION USEFUL AS SHOCK ABSORBERS AND A METHOD FOR THEIR PREPARATION

FIELD OF THE INVENTION

The present invention generally relates to polyurethane foams and elastomers. More specifically, the present invention relates to polyurethane foam and polyurethane elastomer compositions characterized by their shock absorbing capabilities, and to a method of their preparation.

BACKGROUND OF THE INVENTION

Materials capable of absorbing energy are needed for many safety, medical and orthopedic applications such a helmets, body protection pads and playground surfaces. In order that the material may absorb the maximum amount of energy and have a minimum rebound, which returns the energy to the head or body thereby causing injury, the foam should be of the lowest possible resilience. Energy absorbing materials are typically divided into four categories on the basis of their hardness: semi-rigid, semi-flexible, flexible and elastomeric. Semi-rigid foams are typically made from either expanded polystyrene or polyurethane. Semi-flexible and flexible foams are mainly made of polyurethane. The materials that are the topic of this invention are semi-flexible, flexible, semi-rigid and integral skin foams, and elastomeric polyurethanes with exceptionally low resilience.

Typical energy absorbing polyurethanes are produced from polyether polyols and an isocyanate and have high resiliency. The polyether polyols typically have an average molecular weight of 100 to 20,000 and an average functionality of from 2.4 to 2.7 hydroxyl groups per molecule. Toluene diisocyanates or diphenyl methane diisocyanate are used to produce foams and elastomers with a broad range of properties. The isocyanate functionality is typically from 2.0 to 2.3 isocyanate groups per molecule. For a given formulation the total diisocyanate groups are equivalent to, or in a slight excess, relative to the total number of hydroxyl groups.

In the past, castor oil was widely used in order to reduce the resiliency of polyurethane foams however this has been largely replaced by synthetic plasticizers. According to Syzycher's "Handbook of Polyurethanes", Michael Syzycher, CRC Press, LLC, 1999, Chapter 8.5.5), foams prepared with castor oil have a tendency to shrinkage, and should be coated or otherwise protected from water due to their open cell structure. Thus there is disclosed in U.S. Pat. No. 4,987,156 a shock-absorbing polyurethane foam in which liquid plasticizers such as adipate, maleate and phosphate esters were added to improve the low temperature resilance. The upper limit of use of the plasticizers was 150 pph. Above this the plasticizer inhibited the reaction between the polyols and the isocyanate. U.S. Pat. No. 5,128,381 proposes use of a mixture of plasticizers such as alkyl phenols and hydroxyalkyl phthalate esters. A disadvantage of the use of plasticizers is their tendency to sweat out of the foam causing a loss of properties and an unpleasant sticky sensation on contact with them. Another type of additive used to reduce resilience is asphalt as is exemplified in Japanese disclosures 152740/1986 and 15433/1984. However these rams had a narrow temperature range of application, and their energy absorbtion was limited to essentially room temperature. Other additives which have been utilized in the production of polyurethane foams include: phase change materials such as high hydrocarbons, disclosed in U.S. Pat. No. 5,677,048; chain extenders, disclosed in U.S. Pat. No. 5,047,494, water swellable fillers such as lignite and peat, disclosed in U.S. Pat. No. 4,734,439; silicone containing surfactants, disclosed in U.S. Pat. No. 4,554,295; organosilicone oils, disclosed in U.S. Pat. No. 3,926,866; and dispersions of organic and inorganic fillers less than 7 microns in size, disclosed in U.S. Pat. No. 4,243,755.

In U.S. Pat. No. 5,849,806 a low resilience polyurethane foam was produced using a special polydiene diol/mono-ol mixture, a tackifier and an oil in order to achieve good adhesion to substrates such as paper and tapes. These formulations, while producing low resilience foams suffer from a number of process limitations such as very high viscosities which necessitated preheating to 150° C. prior to and casting, and the use of special diols and mono-ols. Neither of these conditions are common practice in the polyurethane industry and therefore these formulations are of limited applicability. The inventors did not teach the applicative potential of these low resilience foams in applications other than adhesive tapes and sealants.

There is therefore a need for a low resilience polyurethane foam with a wide temperature range of application, which call be manufactured using conventional triols, and under processing conditions common in the polyurethane foam industry.

It is the object of the present invention to provide a series of low resilience foams with excellent energy absorbing properties that may be prepared from standard triols and/or diols, isocyanates and tackifying agents. The prepolymers are of low viscosity, easily mixed at room temperature and processed under regular industrial conditions.

These and other objects of the present invention will become more apparent from the summary of the invention and the detailed description of the drawings that follow.

SUMMARY OF THE INVENTION

The present invention relates to a polyurethane foam composition comprising at least:

At least one polyether polyol having an average molecular weight from 100-20,000; an aromatic polyisocyanate; a tackifying resin; a surfactant; a blowing agent, and at least one catalyst.

In accordance with a preferred embodiment of the present invention, the polyether polyol contains at least one member of the following group: poly(oxypropylene glycol), poly (oxyethylene glycol), poly(oxytetra methylene glycol).

Additionally in accordance with a preferred embodiment of the present invention, the polyether polyol has functionality within the range of one to free hydroxyl groups per molecule. In another preferred embodiment, the polyether polyol has an hydroxyl number of 25-800.

Moreover in accordance with a preferred embodiment of the present invention, the polyether polyol has an average molecular weight of 100 to 20,000.

Additionally in accordance with a preferred embodiment of the present invention, the polyisocyanate is methylene bis diphenyl-isocyanate having a functionality of 2.4 isocyanate groups per molecule, and is present at a concentration of 35-175 parts by weight per hundred parts polyol.

Still further in accordance with a preferred embodiment of the present invention, the blowing agent is water and the concentration of water is 0.1-5 parts by weight per hundred parts polyol.

Further in accordance with a preferred embodiment of the present invention, the blowing agent is hydro-chloro-fluoro-carbon, and is present at a concentration of 3-40 parts by weight per hundred parts polyol.

Moreover in accordance with a preferred embodiment of the present invention, the tackifying resin is rosin ester and is present at a concentration of 50-500 parts by weight per hundred parts polyol. The most preferred concentration is 100 parts by weight.

Additionally in accordance with a preferred embodiment of the present invention, the tackifying resin is hydrocarbon, or a mixture of rosin and hydrocarbon, and is present at a concentration of 30-400 parts by weight per hundred parts polyol. The most preferred concentration is 100 parts by weight.

Still further in accordance with a preferred embodiment of the present invention, the surfactant is a silicone-based surfactant formulated for use with the isocyanate methylene bis diphenyl-isocyanate, present at a concentration of 0.1-1.2 parts by weight per hundred parts polyol.

Further in accordance with a preferred embodiment of the present invention, the polyurethane foam additionally contains the catalyst [67% dipropylene glycol and 33% 1,4-diazabicyclo[2.2.2]octane], also known as LV33, at a concentration of 0.3-3.0 parts by weight per hundred parts polyol.

Moreover in accordance with a preferred embodiment of the present invention, the polyurethane foam additionally contains a tertiary amine catalyst at a concentration of 0.1-3.0 parts by weight per hundred parts polyol.

Still further in accordance with a preferred embodiment of the present invention, the polyurethane foam additionally contains glycerin at a concentration of 1-24 parts by weight per hundred parts polyol.

Additionally, in accordance with a preferred embodiment of the present invention, the polyurethane foam additionally contains stannous octoate catalyst at a concentration of 0.1-0.5 parts by weight per hundred parts polyol.

Additionally, in accordance with a preferred embodiment of the present invention, the polyurethane foam additionally contains at least one of the following: a flame retardant, a UV stabilizer, an antistatic agent, a cross-linker, a plasticizer, a viscosity reducer; present at concentrations of 0.1-10 parts by weight per hundred parts polyol.

The present invention also relates to a polyurethane elastomer comprising: a combination of at least two polyether polyols, a tackifying resin, an aromatic isocyanate, and at least one catalyst.

Further in accordance with a preferred embodiment of the present invention, in the polyurethane elastomer, the polyether polyol is at least one member of the following group: poly(oxypropylene glycol), poly(oxyethylene glycol) and poly(oxytetra methylene glycol).

Additionally in accordance with a preferred embodiment of the present invention, in the polyurethane elastomer, one of the polyether polyols has a functionality within the range of one to three hydroxyl groups per molecule.

Furthermore, in one preferred embodiment, in the polyurethane elastomer, the first one of the at least two polyether polyols has an average molecular weight of 1,000-8,000. In another preferred embodiment, the first polyether polyol has an hydroxyl number of 25-60. In one preferred embodiment, this first polyether polyol is present at a concentration of 50-90 parts by weight per total polyol content.

Still further in accordance with a preferred embodiment of the present invention, in the polyurethane elastomer, the second polyether polyol has an hydroxyl number of 25-800. In certain embodiments the second polyether polyol has an average molecular weight of 100-1000. Furthermore, in one preferred embodiment, this second polyether polyol is present at a concentration of 10-50 parts by weight per total polyol content.

Moreover, in accordance with a preferred embodiment of the present invention, in the polyurethane elastomer, the polyisocyante is methylene bis diphenyl-isocyanate having a functionality of 2.4 isocyanate groups per molecule, and is present at a concentration of 20-80 parts by weight per hundred parts polyol.

Additionally in accordance with a preferred embodiment of the present invention, in the polyurethane elastomer, the tackifying resin is selected from at least one of the following group: rosin ester, hydrocarbon, or a mixture of hydrocarbon and rosin. Preferably, in such case, the tackifying resin is present at a concentration of 50-300 parts by weight per hundred parts polyol.

Still further in accordance with a preferred embodiment of the present invention, in the polyurethane elastomer, the catalyst is stannous octoate catalyst at a concentration of 0.3-1 parts by weight per hundred parts polyol.

Moreover in accordance with a preferred embodiment of the present invention, the polyurethane foam additionally contains a tertiary amine catalyst at a concentration of 0.1-3.0 parts by weight per hundred parts polyol.

Additionally, in accordance with a preferred embodiment of the present invention, the polyurethane foam additionally contains at least one of the following: a flame retardant, a UV stabilizer, an antistatic agent, a crosslinker, a plasticizer, a viscosity reducer; present at concentrations of 0.1-10 parts by weight per hundred parts polyol.

There is also provided in the present invention, a method for preparation of a polyurethane foam composition useful in shock absorption, comprising the steps of mixing at least one polyether polyol having an average molecular weight from 100-20,000, with at least one catalyst, with surfactant, with a tackifying resin and with a blowing agent, at a temperature of 20-25° C. (room temperature); stirring for up to ten minutes; adding aromatic polyisocyanate; stirring the mixture for up to one additional minute, pouring the robe into a mold at a temperature of 25-50° C. and obtaining the polyurethane foam. The at least one polyol, the at least one catalyst, the surfactant, the tackifying resin and the blowing agent may be as previously described.

The present invention further provides a method for preparation of a polyurethane elastomer useful in shock absorption, comprising the steps of mixing a plurality of polyether polyols with a tackifying resin and with at least one catalyst, at a temperature of 20-25° C. (room temperature); stirring for up to 10 minutes; adding aromatic polyisocyanate; stir the mixture for up to one additional minute, pouring into a mold and obtaining the polyurethane elastomer. The polyether polyols, the tackifying resins the at least one catalyst and the aromatic polyisocyanate are as previously described.

DETAILED DESCRIPTION OF THE PREFERRED EMBODIMENTS

It is appreciated that the detailed description that follows is intended only to illustrate certain preferred embodiments of the present invention. It is in no way intended to limit the scope of the invention, as set out in the claims.

All novel samples of the present invention were prepared as follows:

Polyols were mixed with the catalysts, with surfactant and with the blowing agent at 22-24° C., and stirred for up to ten minutes. Isocyanate was added, and the mixture was stirred for up to one minute more, then poured into a mold at a temperature of 25-50° c.

Shock absorption was measured (in all examples described in the present invention) using a device that drops a mss of 5-6 kg from a height of approximately one meter onto a foam preparation that is 15 mm thick. Impact energy is equivalent to 50J. The de-acceleration of the mass is measured in G (9.8 m/sec$^2$). In addition, the force (F) transmitted through the foam was measured on the side of the foam opposite the side of the impact [in units of (KN)].

Referring to Table 1, Sample 1 is a reference sample, i.e. it is a formulation that is common and is brought only to compare it shock absorbing qualities to some of the novel formulations in the present invention, Samples 2-6.

Concentrations of materials are expressed in parts by weight per hundred parts polyol. The polyol, termed Polyol 1, is a triol with an average molecular weight of 4700, except for Sample 4, where the triol has an average molecular weight of 6000. Sample 2 contains a tackifier, liquid rosin ester, which is not present in Sample 1. The energy absorption is twice that of Sample 1, seen both in the de-acceleration rate (413G in Sample 2 versus 943G in Sample 1) and in the level of force transmitted (19KN in Sample 2 versus 43KN in Sample 1).

Sample 3 is as Sample 2, but the primary difference is it additionally contains glycerin, and stannous octoate catalyst. The energy absorption is improved.

Sample 4 is similar to Sample 3, the nature of the polyol is different. In Sample 4 the polyol has an average molecular weight of 6000, and a hydroxyl number of 26-32 (trade name Voranol CP 6001, by The Dow Chemical Company), while in samples 1-3 and 5-8 the polyol, termed Polyol 1, has an average molecular weight of 4700, and a hydroxyl number or 32-37 (trade name Voranol CP 4702 by The Dow Chemical Company). The level of tackifying resin was also raised, and the result is a pliable foam, with slightly lower energy absorption levels.

Sample 5 is different from the previous samples in the type of tackifier; hydrocarbon instead of rosin ester. Energy absorption levels are similar.

Sample 6 is similar to Sample 3, however a diol is present in equal quantities to the triol Polyol 1.

Samples 2-6 are kinetic energy absorbing flexible foams, and as such may be used in applications in various industries. They may be used as head rests in the automobile industry, to create walls for sports activities, as packaging materials and in medical and orthopedic products.

Samples 7-8 are semi-rigid foam formulations. Possible applications of these foams are for personal safety head-protection accessories. Note that semi-rigid formulations do not totally recover their original shape after impact, and this may prevent repeated use.

Sample 7 is a semi-rigid foam formulation based on the diol of the previous sample, with no triol component. Energy absorption is similar to samples 2-6.

Sample 8 is another semi-rigid foam formulation, the primary difference between it and previous samples is the increase in water content. Energy absorption is similar to previous samples.

TABLE 1

| Parts by weight | Sample 1 (Ref) | Sample 2 | Sample 3 | Sample 4 | Sample 5 | Sample 6 | Sample 7 | Sample 8 |
|---|---|---|---|---|---|---|---|---|
| | FLEXIBLE | | | | | | SEMI RIGID | |
| POLYOL 1 | 100 | 100 | 100 | 100 | 100 | 50 | — | 100 |
| DIOL | — | — | — | — | — | 50 | 100 | — |
| TACKIFIER | — | 300 Rosin | 300 Rosin | 400 Rosin | 300 Hydrocarbon | 300 Rosin | 300 Rosin | 300 Rosin |
| LV 33 | 0.5 | 0.5 | 0.4 | 0.4 | 0.4 | 0.4 | 0.4 | 0.4 |
| AMINE CATALYST | 0.75 | 0.75 | 0.25 | 0.25 | 0.25 | 0.25 | 0.25 | 0.25 |
| GLYCERIN | — | — | 6 | — | 6 | 6 | 6 | 3 |
| WATER | 3 | 3 | 3 | 3 | 3 | 3 | 3 | 5 |
| Sn Oc | — | — | 0.3 | 0.3 | 0.3 | 0.3 | 0.3 | 0.3 |
| SURFACTANT | 1 | 1 | 1.2 | 1.2 | 1.2 | 1.2 | 1.2 | 1.2 |
| MDI | 35 | 110 | 135 | 130 | 135 | 140 | 170 | 150 |
| G (9.81 m/sec2)* de-acceleration | 943 | 413 | 119 | 150 | 137 | 199 | 159 | 123 |
| F (KN) Force Transmitted* | 43 | 19 | 8 | 10 | 8.5 | 16.5 | 12 | 9 |

*De-acceleration and Force Transmitted were measured by dropping a mass of 5-6 kg from a height of approx. 1 m onto samples. Sample thickness was 15 mm. Impact energy was equivalent to 50 J.

TABLE 2

| Parts by weight | Sample A | Sample B | Sample C | Sample D | Sample E | Sample F | Sample G | Sample H |
|---|---|---|---|---|---|---|---|---|
| | FLEXIBLE | | | | | | | |
| POLYOL 1 parts by wt. | 55 | 60 | 55 | 55 | 55 | 30 | 30 | 30 |
| OH Number | OH-34 | OH-56 | OH-27 | OH-27 | OH-56 | OH-34 | OH-34 | OH-34 |
| POLYOL 2 parts by wt. | 15 | 10 | 15 | 15 | 15 | 30 | 30 | 30 |
| OH Number | OH-450 | OH-450 | OH-400 | OH-400 | OH-450 | OH-335 | OH-335 | OH-335 |
| POLYOL 3 parts by wt. (OH-280) | 30 | 30 | 30 | 30 | 30 | 20 | 20 | 20 |
| TACKIFIER 1 Rosin | 100 | 100 | 75 | 50 | — | 70 | — | 100 |
| TACKIFIER 2 | — | — | 25 | 50 | 100 | — | 70 | — |

TABLE 2-continued

| | FLEXIBLE | | | | | | | |
|---|---|---|---|---|---|---|---|---|
| Parts by weight | Sample A | Sample B | Sample C | Sample D | Sample E | Sample F | Sample G | Sample H |
| Hydro-carbon | | | | | | | | |
| AMINE BALANCE CATALYST | 1 | 1 | 1.5 | 1.5 | 1.5 | 2 | 2 | 2 |
| AMINE GEL CATALYST | 0.5 | 0.5 | 0.5 | 0.5 | 0.5 | 1 | 1 | 1 |
| TIN CATALYST | — | — | — | — | — | — | — | 0.3 |
| SURFACTANT | 2 | 2 | 2 | 2 | 2 | 4 | 4 | 4 |
| ANTI OXIDANT | 2 | 2 | 2 | 2 | 2 | 2 | 2 | 2 |
| FLAME RETARDANT | 3 | 3 | 2 | 2 | 2 | — | — | 1 |
| WATER | 3 | 5 | 3 | 3 | 3 | 25 | 25 | 25 |
| MDI | 70 | 80 | 75 | 75 | 75 | 135 | 135 | 135 |
| G (9.81 m/sec2) de-acceleration | 208 | 212 | 263 | 291 | 294 | 194 | 239 | 187 |

Referring to Table 2, additional flexible foam formulations are shown, formulated using a mixture of three polyols at various concentrations. The formulations shown in these samples (Samples A-H) have various shock absorbing capabilities. A flame retardant was included in these formulations, as was a second tackifier (a hydrocarbon) and a mix of hydrocarbon and rosin.

Referring to Table 3, the samples shown are semi-flexible integral skin foams, and their energy-absorbing qualities may be utilized in automobile bumpers, sports activity mattresses, personal safety body protectors, packaging materials, playground pallets and road safety products.

Sample 9 is an integral skin reference sample, i.e. it is a formulation which is common and is brought only to compare its shock absorbing qualities to the novel formulations in the present invention, Samples 10-12.

Sample 10 is as Sample 9, but it additionally contains rosin ester as a tackifier. The energy absorption is three times that of the reference sample, sample 9, which does not contain tackifier. (Improvement in the energy absorption values may be seen in the de-acceleration rate and the level of force transmitted.)

Sample 11 is similar to Sample 10, however Polyol 2 is monoethylene-glycol, while in Sample 10 it was polyethylene glycol.

Sample 12 is similar to Sample 10, however Polyol 2 is di-ethylene-glycol, while in Sample 10 it was polyethylene glycol.

Referring to Tables 4 and 5, the samples shown are semi-flexible and semi-flexible integral skin foams, which can be utilized in such applications as the samples described in Table 3. These samples were formulated using a mixture of three polyols at various concentrations. The formulations shown in these samples (Samples I-O, and Samples P-T) have various shock absorbing capabilities. A flame retardant was included in these formulations, as was a second tackifier (a hydrocarbon) and a mixture of hydrocarbon and rosin.

TABLE 3

| | SEMI FLEXIBLE | | | |
|---|---|---|---|---|
| Parts by weight | Sample 9 (Ref) | Sample 10 | Sample 11 | Sample 12 |
| POLYOL 1 | 100 | 100 | 100 | 100 |
| TACKIFIER | — | 200 Rosin | 300 Rosin | 300 Rosin |
| POLYOL 2 (GLYCOL) | 45 PEG* | 45 PEG | 24 MEG** | 38 DEG*** |
| LV 33 | 0.9 | 0.9 | 0.9 | 0.9 |
| GLYCERIN | 3 | 3 | 4 | 6 |
| SURFACTANT | 0.5 | 0.5 | | 1 |
| HCFC | 20 | 20 | 20 | 20 |
| MDI | 50 | 80 | 140 | 140 |
| G (9.81 m/sec2) de-acceleration$^a$ | 757 | 206 | 210 | 212 |
| F (KN) Force Transmitted$^a$ | 29 | 12 | 14 | 14 |

*PEG = POLYETHYLENE-GLYCOL
**MEG = MONO-ETHYLENE-GLYCOL
***DEG = DI-ETHYLENE-GLYCOL $^a$De-acceleration and Force Transmitted were measured by dropping a mass of 5-6 kg from a height of approx. 1 m onto samples. Sample thickness was 15 mm. Impact energy was equivalent to 50 J.

TABLE 4

| | SEMI FLEXIBLE | | | | | | |
|---|---|---|---|---|---|---|---|
| Parts by weight | Sample I | Sample J | Sample K | Sample L | Sample M | Sample N | Sample O |
| POLYOL 1 parts by wt. | 25 | 25 | 25 | 25 | 25 | 25 | 25 |
| OH Number | OH-56 | OH-56 | OH-27 | OH-27 | OH-34 | OH-34 | OH-34 |
| POLYOL 2 parts by wt. | 35 | 40 | 35 | 40 | 25 | 25 | 25 |
| OH Number | OH-450 | OH-450 | OH-400 | OH-400 | OH-335 | OH-335 | OH-335 |
| POLYOL 3-parts by wt. (OH-21) | 40 | 35 | 40 | 35 | 25 | 25 | 25 |
| POLYOL 4-parts by wt. (OH-280) | — | — | — | — | 25 | 25 | 25 |

TABLE 4-continued

SEMI FLEXIBLE

| Parts by weight | Sample I | Sample J | Sample K | Sample L | Sample M | Sample N | Sample O |
|---|---|---|---|---|---|---|---|
| TACKIFIER 1 Rosin | 75 | 150 | — | 80 | 65 | 100 | 70 |
| TACKIFIER 2 Hydro-carbon | — | — | 75 | 20 | — | — | 30 |
| AMINE BALANCE CATALYST | 2 | 2 | 2 | 2 | 2 | 2 | 2 |
| AMINE GEL CATALYST | 1 | 1 | 1 | 1 | 0.5 | 0.5 | 0.5 |
| SURFACTANT | 1.5 | 1.5 | 1.5 | 1.5 | 1 | 1 | 1 |
| ANTI OXIDANT | 3 | 3 | 3 | 3 | 2 | 2 | 2 |
| FLAME RETARDANT | 1 | 1 | 1 | 1 | — | — | — |
| WATER | 4 | 4 | 4 | 4 | 3 | 3 | 3 |
| MDI | 90 | 90 | 95 | 95 | 100 | 100 | 100 |
| G (9.81 m/sec$^2$) de-acceleration | 142 | 121 | 189 | 137 | 128 | 113 | 148 |

TABLE 5

INTEGRAL SKIN

| Parts by weight | Sample P | Sample Q | Sample R | Sample S | Sample T |
|---|---|---|---|---|---|
| POLYOL 1-Parts by wt. | 55 | 70 | 70 | 70 | 70 |
| (OH-34) | | | | | |
| POLYOL 2 parts by wt. | 5 | 5 | 10 | 10 | 10 |
| OH Number | OH-450 | OH-335 | OH-400 | OH-400 | OH-400 |
| POLYOL 3 PEG | 30 | 20 | 15 | 20 | 20 |
| POLYOL 4 DEG | 10 | 5 | 5 | 5 | 5 |
| TACKIFIER 1 Rosin | 100 | 110 | 150 | 80 | — |
| TACKIFIER 2 Hydro-carbon | — | — | — | 40 | 120 |
| AMINE BALANCE CATALYST | 1 | — | 1 | 1 | 1 |
| AMINE GEL CATALYST | 1 | 2.4 | 1 | 1 | 1 |
| ANTI OXIDANT | 1 | 1 | 1 | 1 | 1 |
| WATER | 2 | 1.5 | 1.5 | 1.5 | 1.5 |
| MDI | 75 | 70 | 70 | 70 | 70 |
| G (9.81 m/sec2) de-acceleration | 109 | 101 | 93 | 154 | 182 |

TABLE 6

SEMI RIGID

| Parts by weight | Sample U | Sample V | Sample W | Sample X | Sample Y | Sample Z | Sample α | Sample β | Sample χ |
|---|---|---|---|---|---|---|---|---|---|
| POLYOL 1 Parts by wt. | 80 | 30 | 50 | 65 | 30 | 30 | 65 | 30 | 30 |
| OH Number | OH-34 | OH-34 | OH-27 | OH-27 | OH-27 | OH-56 | OH-56 | OH-34 | OH-34 |
| POLYOL 2 Parts by wt. | 20 | 30 | 50 | 15 | 30 | 50 | 15 | 30 | 30 |
| OH Number | OH-240 | OH-240 | OH-380 | OH-380 | OH-400 | OH-400 | OH-660 | OH-450 | OH-450 |
| POLYOL 3 (OH-280) | 15 | 30 | 15 | 20 | 30 | 20 | 20 | 30 | 30 |
| TACKIFIER 1 Rosin | 65 | 70 | 70 | 85 | 100 | 100 | 150 | 50 | — |
| TACKIFIER 2 Hydro-carbon | — | — | — | — | — | — | — | 30 | 80 |
| AMINE BALANCE CATALYST | 1.7 | 2 | 1.7 | 2 | 2 | 2 | 2 | 2 | 2 |
| AMINE GEL CATALYST | 0.3 | 1 | 0.5 | 0.5 | 1 | 1 | 1 | 1 | 1 |
| SURFACTANT | 1.5 | 1.5 | 3 | 0.5 | 1.5 | 2 | 1 | 1.5 | 1.5 |
| ANTI OXIDANT | 3 | 3 | 3 | 2 | 3 | 2 | 2 | 3 | 3 |
| FLAME RETARDANT | 1 | 1 | 1 | 1 | 1 | 1 | 1 | 1 | 1 |
| WATER | 7 | 10 | 17 | 5 | 10 | 4 | 4 | 5 | 5 |
| MDI | 110 | 110 | 135 | 135 | 120 | 120 | 120 | 120 | 120 |
| G (9.81 m/sec2) de-acceleration | 74 | 82 | 86 | 67 | 63 | 58 | 49 | 112 | 142 |

Referring to Table 6, the samples shown are semi-rigid formulations. Possible applications of these foams are (as mentioned) for packaging, personal safety, head-protection accessories, for automotive and for road safety applications. Note that semi-rigid formulations do not totally recover their original shape after impact, and this may prevent repeated use.

Referring to Table 7, several elastomeric formulations are shown. Sample 13 is an elastomer reference sample, i.e. it is an elastomer formulation that is common and is brought only to compare its shock-absorbing qualities to the novel elastomer formulations in the present invention, Samples 14-15. The elastomers shown are all formed using mixed polyols. The low molecular weight polyol has an average molecular weight of 137 and a hydroxyl number of 400-420 (trade name Voranol RN 411 by The Dow Chemical Company), and the high molecular weight polyol has an average molecular weight of 4700 and a hydroxyl number of 32-37 (trade name Voranol CP 4702 by The Dow Chemical Company).

Sample 14 has improved shook absorption as compared with Sample 13, due to the presence of tackifier (rosin ester).

Sample 15 contains a greater amount of tackifier than Sample 14, and is more pliable than Sample 14.

Samples 14 and 15, being polyurethane elastomers, are useful in applications for medical and orthopedic products, and for road safety products.

Referring to Table 8, additional elastomeric formulations are shown. Note that in these formulations, a flame retardant was included, as were a second tackifier (a hydrocarbon) and a mixture of hydrocarbon and rosin.

The shock-absorbing capabilities of each sample vary in accordance with the variations in the formulation components.

TABLE 7

| ELASTOMER | | | |
|---|---|---|---|
| Parts by weight | Sample 13 (Ref) | Sample 14 | Sample 15 |
| 4700 * | 70 | 70 | 70 |
| 400 ** | 30 | 30 | 30 |
| TACKIFIER | — | 110 Rosin | 150 Rosin |
| Sn Oc | 0.25 | 0.3 | 1 |
| MDI | 40 | 40 | 40 |
| G (9.81 m/sec2) *** De-acceleration | 445 | 224 | 208 |
| *** F (KN) Force Transmitted | 39 | 23 | 22 |

* Polyol with molecular weight of 4700.
** Polyol with Hydroxyl No. of 400.
*** De-acceleration and Force Transmitted were measured by dropping a mass of 5-6 kg from a height of approximately 1 m onto samples. Sample thickness was 15 mm. Impact energy was equivalent to 50 J.

TABLE 8

| ELASTOMER | | | | | |
|---|---|---|---|---|---|
| Parts by weight | Sample 16 | Sample 17 | Sample 18 | Sample 19 | Sample 20 |
| POLYOL 1 (OH-34) | 90 | 90 | 70 | 70 | 70 |
| POLYOL 2 parts by wt. | 10 | 10 | 30 | 30 | 30 |
| OH Number | OH-400 | OH-400 | OH-450 | OH-450 | OH-450 |
| TACKIFIER 1 Rosin | 110 | 80 | 80 | 60 | — |
| TACKIFIER 2 Hydro-carbon | — | 30 | — | 20 | 80 |
| AMINE CATALYST | 3.1 | 3.1 | — | — | — |
| TIN CATALYST | 1.8 | 1.8 | 0.5 | 0.5 | 0.5 |
| ANTI OXIDANT | 1 | 1 | 1 | 1 | 1 |
| FLAME RETARDANT | 1 | 1 | 1 | 1 | 1 |
| MDI | 40 | 40 | 40 | 40 | 40 |
| G (9.81 m/sec2)*** De-acceleration | 173 | 224 | 182 | 249 | 271 |

The invention claimed is:

1. An energy absorbing polyurethane foam composition comprising:
at least one polyether polyol having an average molecular weight from 100-20,000; a methylene bisdiphenyl-isocyanate having a functionality of 2.4 isocyanate groups per molecule and present at a concentration of 35-175 parts by weight per hundred parts polyol; a tackifying resin; a surfactant; a blowing agent, and a catalyst; and wherein the tackifying resin is selected from the group consisting of hydrocarbon resin, rosin ester and a combination thereof, the polyurethane foam composition having energy absorbing capabilities equivalent to or greater than the energy absorbing capability exhibited by a 15 mm thickness of the polyurethane foam composition decelerating a mass of 5 to 6 kg dropped from a height of approximately one meter at a rate of 413 times 9.8 m/s$^2$.

2. A composition according to claim 1, wherein the polyether polyol is selected from the group consisting of poly (oxypropylene glycol), poly(oxyethylene glycol), and poly (oxytetra methylene glycol) and mixtures thereof.

3. A composition according to claim 1, wherein the polyether polyol has a functionality within the range of one to three hydroxyl groups per molecule.

4. A composition according to claim 1, wherein the polyether polyol has an hydroxyl number of 25-800.

5. A composition according to claim 1, wherein the blowing agent is water and the concentration of water is 0.1-5 parts by weight per hundred parts polyol.

6. A composition according to claim 1, wherein the blowing agent is hydro-chloro-fluoro-carbon and is present at a concentration of 3-40 parts by weight per hundred parts polyol.

7. A composition according to claim 1, wherein the tackifying resin is rosin ester and is present at a concentration of 50-500 parts by weight per hundred parts polyol.

8. A composition according to claim 1, wherein the tackifying resin is hydrocarbon resin, and is present at a concentration of 30-400 parts by weight per hundred parts polyol.

9. A composition according to claim 1, wherein the surfactant is a silicone-based surfactant formulated for use with the isocyanate methylene bis diphenyl-isocyanate, present at a concentration of 0.1-1.2 parts by weight per hundred parts polyol.

10. A composition according to claim 1 further containing the catalyst (67% dipropylene glycol and 33% 1,4-diazabicyclo[2.2.2]octane), also known as LV33, at a concentration of 0.3-3.0 parts by weight per hundred parts polyol.

11. A composition according to claim 1, further containing a tertiary amine catalyst at a concentration of 0.1-3.0 parts by weight per hundred parts polyol.

12. A composition according to claim 1, further containing glycerin at a concentration of 1-24 parts by weight per hundred parts polyol.

13. A composition according to claim 1, further containing stannous octoate catalyst at a concentration of 0.1-0.5 parts by weight per hundred parts polyol.

14. A composition according to claim 1, further containing at least one of the following: a flame retardant, a UV stabilizer, an antistatic agent, a cross-linker, a plasticizer, a viscosity reducer; present at concentrations of 0.1-10 parts by weight per hundred parts polyol.

* * * * *